United States Patent Office 3,706,778
Patented Dec. 19, 1972

3,706,778
ISOCYANATES AND PREPARATION THEREOF
Hermann Hagemann, Cologne-Flittard, Germany, assignor to Bayer Aktiengesellschaft, Leverkusen, Germany
No Drawing. Filed July 17, 1969, Ser. No. 842,726
Claims priority, application Germany, July 31, 1968,
P 17 93 088.0
Int. Cl. C07c 119/04, 153/07
U.S. Cl. 260—455 R     2 Claims

ABSTRACT OF THE DISCLOSURE

Organic isocyanates are prepared by a process wherein N-chlorocarbonyl isocyanate is reacted with a compound containing hydroxyl or thiol groups. A preferred embodiment of the invention comprises producing organic isocyanates having the general formula

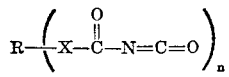

wherein R represents an n-valent radical which may be saturated or unsaturated and which may be substituted, X is oxygen or sulfur and $n$ is a positive integer, produced by reacting N-chlorocarbonyl isocyanate with compounds of the general formula

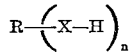

wherein R, X and $n$ are as defined above, preferably at a temperature of from about $-100°$ C. to about $200°$ C. The isocyanates are useful in the production of synthetic resins according to known procedures.

FIELD OF THE INVENTION

This invention relates to organic isocyanates and to a process for preparing organic isocyanates. More particularly this invention relates to organic isocyanates and to a method of preparing organic isocyanates from N-chlorocarbonyl isocyanate.

DISCUSSION OF PRIOR ART

Heretofore, many processes for the production of isocyanates have been known. Most generally, however, the process of phosgenating primary amines has been employed. The use of phosgene is hazardous and phosgene is poisonous. Furthermore, not all isocyanates are obtainable by the phosgenation of amines. Moreover, it is desirable to have a process for the production of amines which avoids the use of phosgene because some of the amines have other phosgene sensitive groups in the molecule. While other methods for the production of isocyanates without the use of phosgene have been known, these other methods such as the Curtius rearrangement of acid azides as well as the Hofmann and Lossen rearrangements, have not been entirely acceptable.

OBJECTS

It is, therefore, an object of this invention to provide organic isocyanates and a process for producing the same which is devoid of the foregoing disadvantages and problems. Another object of this invention is to provide organic isocyanates and a process for producing the same which does not require the use of phosgene. A further object of this invention is to provide novel organic isocyanates. Yet another object of this invention is to provide a process for preparing organic isocyanates which are difficult to prepare by other methods. A still further object of this invention is to provide a process for the preparation of organic isocyanates wherein high yields of the isocyanate products are obtained.

SUMMARY OF THE INVENTION

The forgoing objects and others which will be apparent from the following description are accomplished in accordance with this invention, generally speaking, by providing organic isocyanate by a process which comprises reacting N-chlorocarbonyl isocyanate with compounds having hydroxyl or thiol groups. More particularly, the objects of this invention are accomplished by providing organic isocyanates having the general formula (I) 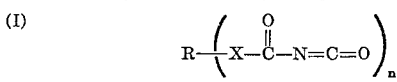

wherein R represents an n-valent radical, which may be saturated or unsaturated, and which may be substituted, X is oxygen or sulfur and $n$ is a positive integer, produced by reacting N-chlorocarbonyl isocyanate, Cl—CO—NCO, with compounds of the general formula (II) 

wherein R, X and $n$ are as defined above.

DETAILED DESCRIPTION OF INVENTION

According to this invention, therefore, novel isocyanates and isocyanates which are difficult to obtain by other methods can be easily and readily prepared in high yields according to the process o tfhis invention wherein isocyanates having the general Formula I are obtained by reacting compounds having the general Formula II with N-chlorocarbonyl isocyanate. The process of this invention may be illustrated by means of the following typical reaction scheme exemplified for a monofunctional reactant:

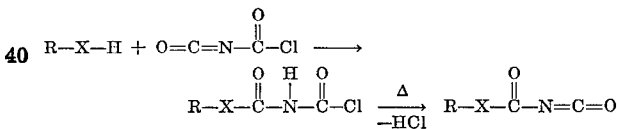

The process of this invention provides a convenient way of producing organic isocyanates, particularly organic isocyanates having the general Formula I. As a preferred embodiment of the invention, organic isocylanates of the general Formula I are produced by reacting compounds of the corresponding general Formula II, wherein R represents an n-valent radical, which may be substituted and is a saturated or unsaturated aliphatic radical, most preferably alkyl having from 1 to 60 carbon atoms, araliphatic radical, most preferably aralkyl having from 7 to 20 carbon atoms, aromatic radical, most preferably aryl having from 6 to 14 carbon atoms, heterocyclic radical, or a radical of compound of molecular weight of from about 800 to about 3000 which contains ester and/or ether and/or thioether groups, X is oxygen or sulfur and $n$ denotes a positive integer, most preferably of from 1 to 4, with at least an equivalent quantity, based on the number of X—H groups present, of N-chlorocarbonyl isocyanate, preferably at a temperature within the range of from about $-100°$ C. to about $+200°$ C. with the reaction to be conducted either in the presence or absence of a suitable inert solvent.

Suitable starting compounds for use in this invention to produce organic isocyanates of the general Formula I are compounds of the general Formula II wherein R, X and $n$ are as previously defined. When R represents an aliphatic radical, preferably an aliphatic hydrocarbon radical, for instance, an alkyl radical, the radical may be saturated or unsaturated, and if unsaturated may contain a triple bond or, if desired, may also contain up to four, preferably up to two, double bonds. The alkyl radicals may also be substituted if desirable, such as, for example, by halogen atoms, preferably chlorine, fluorine or bromine, alkoxy, acyl, acylamino, nitro, azido and $SO_2Cl$ radicals. The araliphatic radical is preferably an aralkyl radical, most preferably a benzyl radical and the aromatic radical is preferably an aryl radical, most preferably a phenyl radical. The aralkyl and aryl radicals may be substituted if desirable such as, for example, by halogen atoms, preferably fluorine, chlorine or bromine, alkyl, alkoxy, acyl, N-alkyl-acylamino, nitro, azido, $SO_2Cl$ radicals.

Although the radicals may be any suitable radical within the scope of the definitions set forth above, the following may be mentioned as examples of such radicals. As examples of aliphatic radicals there may be mentioned alkyl, alkenyl and alkynyl radicals, such as, for example, alkyl such as methyl, ethyl, propyl, butyl, octyl, decyl, eicosyl, tricontyl, tetracontyl, pentacontyl, hexacontyl and the like, alkenyl such as ethenyl, propenyl, butenyl, pentenyl, hexenyl, decenyl, tridecenyl, eicosenyl and the like and alkynyl such as propynyl, butynyl, pentynyl and the like. Additionally, aliphatic is meant to include cycloaliphatic radicals, such as, for example, cycloalkyl such as, for example, cyclopropyl, cyclobutyl, cyclopentyl, cyclohexyl, cycloheptyl and the like, and cycloalkenyl, such as, for example, cyclohexenyl, cycloheptenyl and the like.

As examples of such suitable araliphatic radicals there may be mentioned aralkyl such as benzyl, α-phenyl-ethyl, α-phenyl-propyl, β-phenyl-butyl, α'-naphthyl-methyl, α(α'-naphthyl)ethyl and the like.

As examples of such aromatic radicals there may be mentioned, for example, aryl radicals, such as, for example, phenyl, α-naphthyl, β-naphthyl, α-anthryl, β-anthryl, γ-anthryl and the like and indene, isoidene, acenaphthene, fluorene, phenanthrene and the like and aralkyl radicals such as, for example, o-tolyl, m-tolyl, p-tolyl, 2,3-xylyl, 2,4-xylyl, 2,5-xylyl, 2,6-xylyl, o-cumenyl, mesityl, o-ethylphenyl, 2-methyl-α-naphthyl and the like.

As examples of such suitable heterocyclic radicals there may be mentioned, for example, thienyl, furyl, pyranyl, pyrrolyl, imidazolyl, pyridyl, indolyl and the like.

As examples of such suitable radicals of compounds of molecular weight of from about 800 to about 3000 which contain X—H groups, preferably OH groups, there may be mentioned, for example, radicals of hydroxyl containing polyesters, polyethers or polythioethers, or polyether polyesters or polyether polythioethers and the like.

As examples of such suitable starting materials having the general Formula II there may be mentioned, for example, methanol, ethanol, butanol, decanol, stearyl alcohol, allyl alcohol, butane-1,4-diol, butene-1,4-diols, butyne-1,4-diols, phenol, cresol, naphthol, hydroxyanthracene, methyl mercaptan, butyl mercaptan, decyl mercaptan, stearyl mercaptan, thiophenol, trimethylolpropane, hexane-1,2,6-triol, glycerol, pentaerythritol and the like.

As additional examples of such suitable starting materials there may be mentioned, for example, ethylene glycol, 1,3-propylene glycol, 1,2-propylene glycol, 1,5-pentane diol, 1,4-pentane diol, 1,3-pentane diol, 1,6-hexane diol, 2,5-hexane diol, 1,7-heptane diol, 1,8-octane diol, 2,2-dimethyl-1,3-propane diol, 1,20-eiscosane diol, 2-methyl-3-butyn-2-ol, 1-methyl-1-phenyl ethanol, 2-pentene-1,5-diol, 2-butene-1,3-diol, 2-heptene-1,7-diol, 2-hexene-1,6-diol, 1,1,2,2-tetraphenylethanol, hydroquinone, 2,2'-bis(p-hydroxyphenyl)propane, 2,6-dimethyl phenol, xylenols, trimethyl phenols, 2-chlorophenol, 3-bromophenol, 2,6-dichlorophenol, 4-ethyl pheneol 4-t-butyl phenol, 2-mercaptcbenzothiazole, 2-r ercapto thiazoline, dodecyl mercaptan, ethyl-2-mercapto thiazole, dimethyl-2-mercapto thiazole, β-naphthyl mercaptan, α-naphthyl mercaptan, phenyl-2-mercapto thiazole, 1,2-ethane dithiol, 1,3-propane dithiol, 1,6-hexane dithiol, 2-butene-1,4-dithiol, 1,3,6-hexane trithiol and the like.

As examples of suitable starting materials wherein Formula II represents compounds of molecular weight of from about 800 to about 3000 which contain ester and/or ether and/or thioether groups there may be mentioned the following materials. Suitable polyesters include hydroxyl polyesters such as, for example, the condensation product of carboxylic acids and polyhydric alcohols. Any suitable carboxylic acid may be used in the preparation of such hydroxyl polyesters such as, for example, adipic acid, succinic acid, sebacic acid, suberic acid, oxalic acid, malonic acid, methyl adipic acid, glutaric acid, pimelic acid, azealic acid, phthalic acid, terephthalic acid, isophthalic acid, thiodipropionic acid, maleic acid, fumaric acid, citraconic acid, itaonic acid and the like. Any suitable polyhydric alcohol may be used in the reaction with the carboxylic acid to form suitable polyesters such as, for example, ethylene glycol, propylene glycol, butylene glycol, neopentyl glycol, amylene glycol, hexanediol, bis-(hydroxyl methyl cyclohexane) and the like. Any suitable polyether ester may be used as the organic compound containing X—H groups such as, for example, the reaction product of an ether glycol and a polycarboxylic acid such as those mentioned above with the relation to the preparation of polyesters. Any suitable ether glycol may be used such as, for example, diethylene glycol, triethylene glycol, 1,4-phenylene-bis(hydroxy ethylether), 2,2'-diphenylpropane-4,4'-bis(hydroxy ethylether) and the like.

Suitable polyhydric polyalkylene ethers may also be used as the organic compound containing X—H groups such as, for example, the condensation product of an alkylene oxide with a small amount of a compound containing active hydrogen containing groups such as, for example, water, ethylene glycol, propylene glycol, butylene glycol, amylene glycol, trimethylolpropane, glycerine, hexanetriol, sorbitol, sucrose and the like. Any suitable alkylene oxide condensate may also be used such as, for example, the condensates of ethylene oxide, propylene oxide, butylene oxide, amylene oxide, styrene oxide and the like and mixtures thereof.

Any suitable polyhydric polythioether may also be used as the organic compound containing X—H groups such as, for example, the reaction product of one of the aforementioned alkylene oxides used in the preparation of polyhydric polyalkylene ethers with a polyhydric polythioether such as, for example, thiodiglycol, 3,3'-dihydroxypropyl sulfide, 4,4'-dihydroxybutyl sulfide, 1,4-(β-hydroxyethyl) phenylene dithioether and the like.

The other reactant employed in the process of this invention is N-chlorocarbonyl isocyanate and it is usually employed in equivalent quantities based on the number of X—H groups. However, an excess of N-chlorocarbonyl isocyanate may be employed and is often deemed desirable because it has an advantageous effect on the selectivity of the reaction with the isocyanate group.

The reaction may be carried out either in the presence or the absence of a suitable inert solvent such as, for example, ethers, aliphatic or aromatic hydrocarbons, chlorinated aliphatic or aromatic hydrocarbons and the like. As examples of such suitable inert solvents there may be mentioned, for example, carbon tetrachloride, chloroform, methylene chloride, petroleum ether, benzene, dichlorobenzene, trichlorobenzene and the like.

The process of this invention may be carried out over a wide range of temperatures but is generally conducted at a temperature within the range of between about $-100°$ C. and about $+200°$ C., preferably between about $-50°$ C. and about $+100°$ C., and most preferably between about $0°$ C. and $+30°$ C.

The reaction may be carried out in one or two stages. For example, the reaction between the thiol or hydroxyl compound and the N-chlorocarbonyl isocyanate may be started at a relatively low temperature and then continued at a higher temperature, if desired, under reduced pressure. The products of the process are generally purified by any suitable separation procedure such as, for example, by distillation, recrystallization or the like.

UTILITY

The isocyanates which can be prepared according to the process of this invention may be used for the production of synthetic resins, such as for example, by reacting them with hydroxyl compounds which may be of high molecular weight, according to methods generally known in the art, if desired, with the addition of the usual additives employed in isocyanate chemistry, such as, for example, catalysts, stabilizers, emulsifiers, pigments, dyes or plasticizers and the like. Homogeneous and cellular resins can be obtained in this way, such as, for example, in the form of lacquers, elastomers and rigid and flexible foam plastics. The products of the process themselves, moreover, are particularly suitable for removing unwanted traces of moisture from other synthetic resin compositions.

EXAMPLES

The invention is further illustrated but is not intended to be limited by the following examples in which all parts and percentages are by weight unless otherwise specified.

EXAMPLE 1

About 52.7 parts (about 0.55 mol) of N-chlorocarbonyl isocyanate are introduced into a reaction vessel together with about 200 parts by volume of absolute ether, and a solution of about 55 parts (about 0.5 mol) of thiophenol in about 100 parts by volume of absolute ether are then added dropwise over the course of about 45 minutes, the rectants being at the same time thoroughly mixed and cooled with ice. The temperature is kept at about 5° C. to 10° C. during the addition of the solution of thiophenol. The reaction mixture is then stirred for about a further 15 minutes at about room temperature, the ether distilled off and the residue is heated to about 100° C. for about 2 hours under vacuum (water pump) until no more hydrogen chloride gas is evolved. The product is then distilled and produces about 65 parts (equal to about 73% of theory) of N-phenylsulphenylcarbonyl isocyanate which is obtained as a colorless oil, boiling point 115° C./11 mm. Hg.

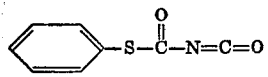

EXAMPLE 2

About 116 parts (about 1.1 mol) of N-chlorocarbonyl isocyanate are introduced into a reaction vessel with ether in the manner described in Example 1 and reacted with about 45 parts (about 0.5 mol) of butane-1,4-diol. The removal of hydrogen chloride is carried out at about 125° C./11 mm. Hg for about one hour and the residue is distilled. About 67.4 parts (equal to about 59% of theory) of butane-1,4-bis(N-oxycarbonyl isocyanate) are obtained in the form of a colorless oil of boiling point 100° C./0.1 mm. Hg.

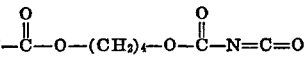

EXAMPLE 3

About 174 parts (about 1.65 mol) of N-chlorocarbonyl isocyanate are reacted with about 87 parts (about 1.5 mol) of allyl alcohol in the manner described in Example 1. Hydrogen chloride is driven off at atmospheric pressure at 125° C. over about three hours.

About 132 (equal to about 70% of theory) of N-allyloxycarbonyl isocyanate are obtained as a colorless oil, boiling point 50° C./15 mm. Hg.

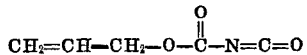

EXAMPLE 4

About 23.2 parts (about 0.22 mol) of N-chlorocarbonyl isocyanate are reacted in the manner described in Example 1 with about 40.4 parts (about 0.2 mol) of dodecyl mercaptan. Hydrogen chloride is removed over about one hour at about 125° C., under vacuum (water pump).

About 42 parts (equal to about 77.5% of theory) of N-dodecyl sulphenylcarbonyl isocyanate, a colorless oil of boiling point 111° C./0.04 mm.Hg, are obtained

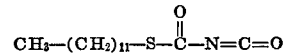

The following compounds are prepared in a similar manner:

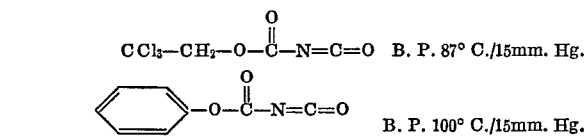

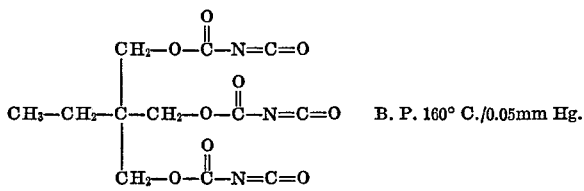

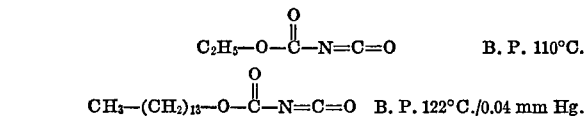

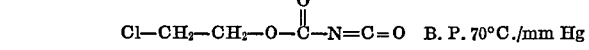

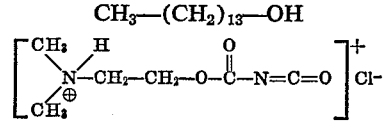

determined as reaction product with

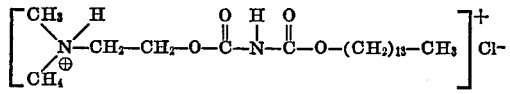

M.P. 187° (decomp.)

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

What is claimed is:

1. A process for the preparation of organic isocyanates which comprises reacting, at a temperature of from about −100° C. to about 200° C., N-chlorocarbonyl isocyanate with a compound having the formula:

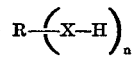

wherein R is an n-valent radical selected from a substituted or unsubstituted, saturated or unsaturated aliphatic hydrocarbon radical, having from 1 to 60 carbon atoms, araliphatic hydrocarbon radical having from 7 to 20 carbon atoms, aromatic hydrocarbon radical having from 6 to 14 carbon atoms or a radical of molecular weight of from about 800 to about 3000 containing ether linkages, said substituents on said substituted radicals are selected from the group consisting of halogen and alkoxy, X is selected from the group consisting of oxygen or sulfur and $n$ is 1 to 3.

2. The process of claim 1 wherein the reaction is conducted in the presence of an inert solvent.

References Cited

March, Advanced Org. Chem., pp. 335 and 663 (1968).
Bennett et al.: J.A.C.S. 90, 3295 (1968).

LORRAINE A. WEINBERGER, Primary Examiner

R. GERSTL, Assistant Exminer

U.S. Cl. X.R.

260—347.2, 347.4, 475 P, 478, 479 S, 482 C, 485 G, 75 TN, 77.5 AP, 77.5 AM, 294.8 G, 295 R, 302, 306, 306.7, 309.6, 326.12 R, 326.13 R, 326.3, 337 R, 345.8